United States Patent [19]

Heissler et al.

[11] 4,050,997
[45] Sept. 27, 1977

[54] METHOD OF MANUFACTURING A FIBER REINFORCED COMPOSITE MATERIAL

[75] Inventors: Herbert Heissler, Munich, Germany; Eckart Hitsch, Salzburg, Austria; Wolfgang Scheer, Munich, Germany

[73] Assignee: Maschinenfabrik Augsburg-Nurnberg Aktiengesellschaft, Germany

[21] Appl. No.: 578,187

[22] Filed: May 16, 1975

Related U.S. Application Data

[63] Continuation-in-part of Ser. No. 315,986, Dec. 18, 1972, abandoned.

[51] Int. Cl.² .............................................. C25D 7/06
[52] U.S. Cl. ...................................... 204/28; 204/385; 204/130; 427/229; 427/434 R
[58] Field of Search ............... 204/130, 131, 140, 385, 204/28; 427/434, 229

[56] References Cited

U.S. PATENT DOCUMENTS

| | | | |
|---|---|---|---|
| 3,261,770 | 7/1966 | Judge | 204/129.5 |
| 3,501,333 | 3/1970 | Groves et al. | 427/217 |
| 3,671,411 | 6/1972 | Ray et al. | 204/130 |
| 3,679,475 | 7/1972 | Basche et al. | 427/52 |
| 3,759,805 | 9/1973 | Chapman et al. | 204/130 |
| 3,772,165 | 11/1973 | Yamagishi et al. | 204/56 R |

FOREIGN PATENT DOCUMENTS

2,065,178   7/1971   France

*Primary Examiner*—R. L. Andrews
*Attorney, Agent, or Firm*—Craig & Antonelli

[57] ABSTRACT

A fiber-reinforced composite material is produced by a method wherein chemical groups are generated on the surfaces of electrically conductive fibers to be used as reinforcing fibers by electrochemical activation in an electrically conductive bath or liquid, the so-activated fibers are treated with a chemical compound in a solvent containing an element capable of combining with the fibers, especially a metal, the compound is decomposed in the solvent to liberate the element and the element is combined with the activated surfaces of said fibers. The activating current for the electrochemical activation is preferably applied to the fibers without mechanical contact by way of the electrically conductive liquid.

10 Claims, 1 Drawing Figure

U.S. Patent    Sept. 27, 1977    4,050,997
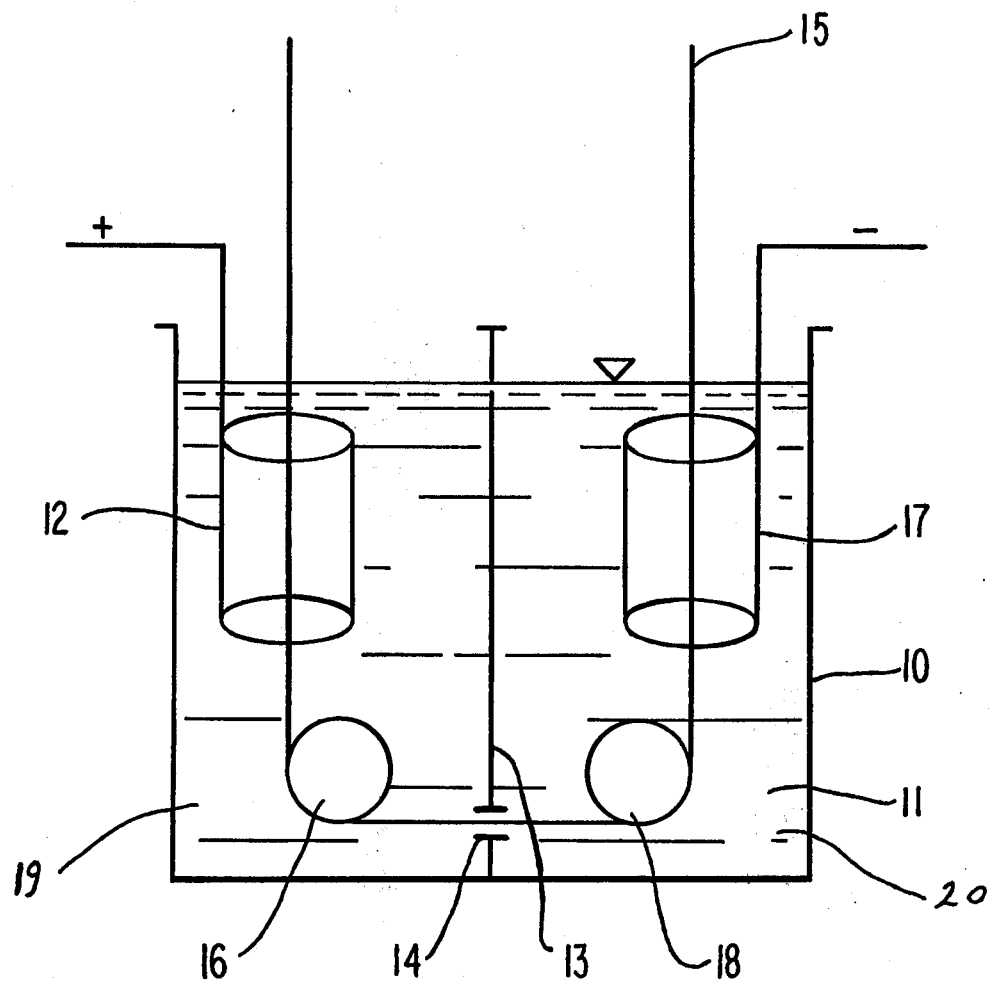

METHOD OF MANUFACTURING A FIBER REINFORCED COMPOSITE MATERIAL

CROSS REFERENCE TO RELATED APPLICATION

This application is a continuation-in-part of application Ser. No. 315,986 filed Dec. 18, 1972 now abandoned.

This invention relates to a method of manufacturing a fiber reinforced composite material. This material consists of a fiber embedding material (matrix) such as aluminum or a polymer, and numerous reinforcing fibers, e.g. of carbon, embedded in this material.

In particular, this invention relates to a method for the production of electrically conductive fibers, e.g. in the form of a thread, for a composite material with improved adhesion between the fibers and an embedding substance, preferably a metal or a metalloid (matrix), by the formation of chemical groups that show linking capability, with respect to the embedding substance, on the fiber surfaces by electrochemical activation of the thread surfaces in an electrically conductive liquid. In this method the need for a metallic coating between the reinforcing fibers and the embedding substance is eliminated.

There are various conventional methods of embedding such fibers in metals or high polymer materials for improving, for example, the mechanical properties, such as tensile strength, modulus of elasticity or bending strength, to suit the particular type and direction of load. Conventionally, fiber materials of superior strength and/or stiffness, such as carbon fibers, are used for the purpose.

The disadvantage in this is that the affinity of the fiber surfaces for the embedding materials is often absent or weak, so that sufficient coupling between the two materials is prevented. As a result, the mechanical properties of the reinforcing fibers in the composite material are not, or only poorly exploited. Moreover, the tensile strength of the composite material at right angles to the axis of the embedded fiber and the interlaminar shear strength often is not sufficient.

In one conventional method for improving the adhesion characteristics of fibers or threads, a thread consisting of numerous carbon fibers is pulled successively over two electrically conductive rollers and therebetween through an aqueous electrolyte, the thread is deflected by the rollers and runs along further guide means and is deflected thereby. The rollers are disposed outside of the electrolyte. The thread is connected as the anode, and the activating current is applied to the thread by way of the rollers. The thread fibers conduct the current further. However, such fibers, due to the manner in which they are produced, have differently large cross sections over the cross section of the thread and also have different types of crystallization. Furthermore, such fibers are not endless, but rather are finite and therefore fibers terminate and start along the length of the thread, so that not every fiber supplied with current at one of the rollers will simultaneously receive current at the other roller. For these reasons, the current distribution over the individual fibers and thus the current density are nonuniform.

Consequently, there is the disadvantage that the aforementioned chemical groups are not formed uniformly on the individual fibers. Thereby, the above-described adhesion can be improved to only an insufficient extent.

Another disadvantage is that the electric potential measured between the thread and the cathode drops between the rollers, due to the relatively high electric resistance of the fibers; thus, the treatment bath is not entirely exploited, increasing the treatment time and the expenses involved.

It is an object of this invention to avoid the first-mentioned disadvantage, i.e. the nonuniform formation of the chemical groups on the individual fibers, to attain during the subsequent manufacture of the composite material a further improvement in the adhesion between the fibers and the embedding substance or material.

To attain this object, the invention resides in that the activating current for the electrochemical process is applied to the fibers without mechanical contact by way of the conductive liquid.

Thus, the activating current is not applied to the fibers via electrically conductive rollers and is not transported by the fibers into the treatment bath, thus also eliminating these rollers. Each fiber is now surrounded by the liquid applying the activating current to the fiber, the liquid flowing uniformly around the fiber. Because of the activating current, electrochemical processes take place on the fibers, whereby chemical groups capable of linking with respect to the embedding material are produced thereon. The current distribution to the individual fibers, the current density, and the production of the chemical groups on the fibers are all uniform. Thereby, an adhesion and/or positive connection can be attained between the fibers and the embedding material which, as seen at right angles to the fibers, is existent everywhere and in approximately the same magnitude in the composite material. The latter can be stressed to a greater extent than in case of the conventional process. The mechanical properties of the fibers, such as, for example, the tensile strength, the flexural strength, the shear strength, the modulus of elasticity, the tensile strength based on density, and the modulus of elasticity based on density, can be better utilized in the composite material. Building components made of the composite material can be calculated at higher strengths. Furthermore, the activation over the fiber length in the current application zone is everywhere equally high, even if the current is introduced into the treatment bath at only one location, for the electric resistance of the liquid is negligibly small as compared to that of the fibers, whereby the treatment bath is fully utilized in the current application zone. In other words, the production of the chemical groups takes place in equal magnitude over the entire fiber length.

Furthermore, the fibers are not stressed mechanically by the non-contactual application of the activation current. Consequently, their mechanical properties and/or strength values are not impaired.

An element, especially light metal, as an embedding material (matrix) is frequently desirable because of certain properties inherent therein, for example a higher heat resistance in case of a light metal as compared to high polymeric embedding plastics. The reinforcing fibers are then to serve, as in these embedding plastics, for obtaining mechanical characterists, e.g. a tensile strength, for the composite material which are better and/or higher than in case of the embedding material and/or element. The mechanical properties of the reinforcing fibers, however, can only be exploited in the composite material if the adhesion between the reinforcing fibers and the embedding material is sufficiently strong. If, for example, reinforcing fibers of carbon are dipped into an aluminum melt, no adhesion can be attained. The surface tension relationships are such that no wetting occurs.

It is known, therefore, to apply at least one other specified heavier metal, namely nickel or copper and thereupon nickel, to the reinforcing fibers before the application of the molten aluminum. However, the adhesion conditions between the at least three materials thus obtained must be paid for by a greater number of process steps and by a higher specific gravity of the respectivcw composite material. Furthermore, also other properties of the intermediate metallic coating often are not precisely suitable for the purposes to be achieved with this composite material. It has also been found that nickel alone as the intermediate layer adheres poorly to carbon fibers. It is also known to treat reinforcing fibers carrying an intermediate coating of a transition metal in a solution with an aluminum hydride compound, then to remove the solution, to dry the fibers under vacuum, and then to heat the fibers in a furnace in order to decompose the aluminum hydride under this heat, thereby forming an aluminum coating on the fiber surface. This process is complicated and furthermore an intermediate metallic coating is again necessary.

It is an object of this invention to provide a method wherein no intermediate metallic coating is required and a sufficient adhesion is attained.

In order to obtain this object, the invention resides in that a chemical compound containing the element forming the matrix or fiber embedding material is decomposed in a solvent containing the reinforcing fibers, thus depositing the element produced during this decomposition onto the reinforcing fibers.

A further object of the present invention is to provide a method of manufacturing fiber reinforced composite materials such that the coupling and transfer of force between the fiber embedding material and the reinforcing fiber is substantially improved.

It is a particular object of the present invention to provide a method for generating chemical groups on the fiber surfaces by electrochemical activation, where the electrical current required for activation is applied to the fibers in the absence of mechanical contact in an electrically conductive liquid, where a chemical compound containing an element is decomposed in a solvent, the element so-liberated separates onto the fibers, and the element combines with the activated surfaces of the fibers.

This affords the following advantages:

The mechanical properties of the fibers, such as tensile strength, modulus of elasticity, tensile strength related to density, and modulus of elasticity related to density, are now more fully exploited in the composite material. Thus in the dimensioning of shapes, use of a composite material improved in accordance with the present invention gives better mechanical properties than could be gained by the use of conventional materials in the same quantities, meaning that smaller quantities of the improved material will be sufficient to achieve the same quality of mechanical properties.

The various cited steps of the method may equally be performed severally, for the following results:

The step in the method by which chemical groups are generated on the fiber surfaces by electrochemical activation, where the electrical current required for activation is applied to the fiber in the absence of mechanical contact, places so little mechanical load on the fibers during intense activation of their surfaces that their mechanical properties are not impaired. The activation of the fiber surfaces effected by this step in the method creates a basic affinity for the fiber embedding materials.

The step in the method by which a chemical compound containing an element is decomposed in a solvent wherein the element separates onto the fibers, permits the element to emerge in an extremely active form and to separate onto the fiber surfaces in an active and coherent form.

The step in the method by which the element, after separating on to the fibers in the second step, combines with the surfaces activated in the said first step, provides a mechanical load sustaining coupling between the fibers and the embedding material.

It is intended that the inventive concept embrace any possible combination of any two of the heretofore described steps of the method.

The decomposition and the deposition on the fibers thus take place in a solvent and/or bath; at the instant of decomposition, the element is produced in the solvent in an atomic and thus extremely active form and primarily on the fiber surfaces which can have a catalytic effect, and the element is deposited on the fiber surfaces in this form and also in a coherent phase, namely on all fibers of a strand, thread, cord, net, fabric, or the like fibrous material. For these reasons, and due to the sufficient roughness of the fiber surfaces in and by this decomposition and deposition bath, a bond is attained between the element and the fibers which renders the adhesion at least satisfactory without the necessity of providing an intermediate coating and/or metal. A decomposition after the drying step and under the heat in a furnace outside of the solvent does not take place.

The three aforementioned process steps, employed together, yield optimum adhesion, since firstly the chemical groups yield, as compared to the above-mentioned fiber surface roughness, a far greater fiber surface roughness and a very high affinity toward joining with the element and, secondly, the element is deposited on the fiber surfaces in an atomic, extremely active and coherent form and, due to both features, the element is very firmly joined with the fiber surfaces, i.e. with the chemical groups.

The method of this invention is inexpensive. The element can be deposited in an electrically conductive or nonconductive form, with a smooth outer surface or with a rough outer surface. It is also readily possible, by means of the present invention, to obtain a layer thickness of the element on the fiber in a desired magnitude. Thus, the element can be easily deposited on the fiber surfaces in such a layer thickness and/or quantity as required for the construction of a composite material which is to consist of the fibers and the element, or of the fibers, the element, and at least one further embedding substance; the latter can be an element, an element mixture, or a compound.

As compared to the metal element by itself, composite fiber reinforced materials produced in accordance with this invention exhibit better mechanical properties, for because of the good adhesion, there is a utilization, or an improved utilization, of the mechanicl properties of the fibers which in most cases are of a high strength and/or a high rigidity; these properties are better as compared to the element and include, for example, tensile strength, modulus of elasticity, tensile strength based on density, and modulus of elasticity based on density. Thus, for example, a greater tensile strength and/or a high modulus of elasticity and/or a greater flexural strength and/or a greater tensile strength as measured at right angles to the axis of the embedded fibers, and/or a greater interlaminar shear strength are attained for the composite material. Components of the composite material can be calculated at higher strengths. Accordingly, it is made possible by this invention to provide fiber reinforced composite materials having an embedding metal element, which materials exhibit good mechanical properties due to the adhesion but also have other required properties due to the embedding metal elements, not inherent in the synthetic resin embedding material. Thus, the embedding light metals and consequently the respective composite fiber substances are, for instance, much more resistant to high temperatures and also stronger and more impact resistant than the plastic embedding materials and/or the respective, composite, fiber reinforced plastic materials. As compared to most other metals and to composite fiber materials with heavy metal interposed layers, the light metal containing composites are distinguished by a relatively minor specific gravity.

The invention embraces but is not limited to the following exemplified embodiments, developments, improvements and the like of the method taught in this invention:

The electrochemical activation of the fiber surfaces by means of the current application in accordance with the present invention can be accomplished by oxidation, reduction, or the like and produces on each individual fiber, for example, an extremely roughened, i.e. very greatly enlarged surface area, similarly as in case of activated carbon.

Electrochemical activation of fibers may be effected in aqueous and non-aqueous liquids. The aqueous liquids may be solutions of acids, bases and/or salts, e.g. oxidizing compounds such as potassium permanganate, ammonium peroxydisulfate, sodium hypochlorite, sulfuric acid, sodium azide or the like in water. The non-aqueous liquids may be liquified gases or other ionizing inorganic or organic compounds, such as ammonia, sulfur dioxide, hydrogen cyanide, hydrogen fluoride, nitrosyl chloride, dinitrogen tetroxide and the like. The concentration of these activating materials in solution may vary considerably, for example, a solution of sulfuric acid in water of 50% acid and of 50% water and a solution of hydronitric acid (hydrazoic acid) or sodium azide in ammonia of 20% acid and 80% of ammonia are effective. Dissolved in these inorganic or organic non-aqueous liquids may be oxidizing or non-oxidizing compounds, such as hydronitric acid (hydrazoic acid) or its salts dissolved in liquid ammonia. Electrochemical activation may be effected by oxidation, reduction or the like.

The chemical groups produced on the fiber surfaces by electrochemical activation may be hydroxyl, carbonyl, carboxyl, lactone, amino, imino, nitro, sulfone, nitrile, azide, isocyanate, sulfonic acid or halogenide groups or the like.

Application of electrical current to fibers in the absence of mechanical contact may be achieved, for instance, in a device a description of which is hereinafter described.

The elements used for the embedding of the fibers may be metals or semimetals, i.e. metalloids, more particularly light metals, such as magnesium, aluminum, titanium, silicon, or the like. The chemical compound containing the element for embedding of the fibers may be an organic compound, specifically a metal-organic compound, such as aluminum-trialkyl wherein the alkyl group may contain from 1 to 8 carbon atoms.

The solvent in which the chemical compound containing an element is dissolved, may be an organic or inorganic, inert or non-inert liquid, specifically an organic solvent, such as hydrocarbon, e.g. "Decalin" (decahydronaphthalene), carbon tetrachloride, xylene, etc. The concentration of the compound to be decomposed in the said solvent may be between greater than 0 and 100 percent.

Decomposition in the solvent of the chemical compound containing an element may be by energy supply, catalytic processes, reduction, spontaneous decomposition, or the like. Accordingly, "decomposition" is used in the sense that the element is liberated for application to the activated surface of the fiber.

Energy may be supplied in the form of heat or electrical current, as in the form of a galvanic process, radiation, or the like. Heat may be supplied by heating the solvent and/or heating the fibers or in some other fashion.

The element produced by said decomposition may separate on said fibers in an active, coherent, electrically conductive or non-conductive form with a smooth or rough outer surface. The element may separate on to the fibers for a coating thickness such that it is present in a sufficient quantity to build up a composite material or that further elements, mixtures thereof or compounds must be added to build up a composite material of desired thickness.

The method of this invention is utilized particularly in case of electrically conductive reinforcing fibers, on the surfaces of which chemical groups have been produced which are bondable with respect to the metal or semimetal element, by means of an electrochemical process under activation of the fiber surfaces in an electrically conductive liquid, the element joining with the activated fiber surfaces, i.e. with these chemical groups. Thereby, the objects of this invention are solved even better, and the aforementioned effects and advantages of the invention are apparent to a greater extent. A positive bond is attained between the element and the fibers, which can be placed under higher mechanical stresses. The adhesion is improved. The activating current for the electrochemical process, the electrochemical activation, is preferably applied to the fibers by way of the conductive liquid; thereby, the current distribution to the individual fibers, the current density, and the formation of the chemical groups on the fibers are uniform, and these groups are furthermore produced to an equal extent over the lengths of the fibers at all locations, whereby the adhesion is still further improved.

The reinforcing fiber may be an inorganic and/or organic fiber specifically if it is one exhibiting superior mechanical properties in the way of tensile strength, modulus of elasticity, and the like. Suitable fibers must be electrically conductive in the case of the electrochemical activation. Suitable fibers are exemplified by carbon fiber or boron filament, both electrically conductive, silicon carbide fiber, silicon boride fiber, filaments of highly drawn high polymers, all electrically non-conductive, or the like. The reinforcing fiber may be in the form of a single filament or bundled, and it may come in the shape of a strand, thread, web, fabric, spun material, or the like. PRD 49, a fiber of Dupont, is an example of a suitable high polymer. The fiber surfaces of the fibers can be pretreated (roughened) by electrochemical activation or by other processes.

The element may combine with the activated fiber surface by chemical or physical union exemplified by adhesion, adsorption, mechanical hook-up and/or mesh, chemical primary or secondary valence union, such as oxygen bridges or nitrogen bridges between carbon atoms of the fiber surface and metal atoms or active groups of high polymer compounds. Union may be effected during or after separation and at normal and/or elevated temperature. Union may occur during or after contact with polymers, specifically organic high polymers and/or the monomeric starting products required for building up high polymers, and with energy supplied or not as e.g. in the reaction of epoxy resins with hydroxyl groups fixed on carbon fiber surfaces.

The material to be reinforced by the fiber includes metals such as aluminum, titanium, or magnesium, high polymers such as epoxy, polyester or polyimide resins or glasses.

The accompanying drawing illustrates an embodiment of a device arranged for implementing electrochemical activation as required in the present invention through generation of chemical groups on fiber surfaces.

As illustrated, there is contained in a vessel 10 an electrically conductive liquid 11 suitable for electrochemical activation of the fiber, e.g. a solution of potassium permanganate in water. The vessel 10 is divided by a partition 13 into two chambers 19 and 20 such that the two chambers are segregated, i.e. one from the other electrically except for an aperture 14 which serves to allow passage of the fibers from one chamber to the other. Immersed in each chamber is a tubular, cylindrical, bilaterally open-ended wire gauze electrode 12 and 17, respectively, which serves to supply and to receive electrical current. The fibers 15, e.g. in the form of a thread, to be activated are conveyed over the deflector pulleys 16 and 18 centrally through the electrode cylinders (wire guaze electrodes) 12 and 17 and the aperture 14, where the fibers serve the function of circuit-closing elements between the two electrode chambers. The fibers are continuously pulled through the liquid 11. The current transfer takes place from the wire gauze electrode 12 via the liquid 11 in the chamber 19 to the fibers 15 and from the fibers 15 via the liquid 11 in the chamber 20 to the wire gauze electrode 17, i.e. in each case without mechanical contact. The motion with which the fibers 15 are drawn through this device is continuous.

The method of this invention will be further understood from the following example:

A carbon fiber strand (Grafil A) made up of about 10,000 fibers each fiber having a thickness of about 0.01 mm., is passed through a device of the type illustrated in the drawing to become activated. In the device the fiber is treated with an activating liquid containing 50% by weight of sulfuric acid and 50% by weight of water and a potential of 10 volts and a current of 5 amperes are applied to the fiber strand as it passes through the liquid. The fiber strand with the activating current being effective is drawn through so gradually that each of its cross-sections is exposed to the activating treatment for 1 minute. Subsequently, the activated fiber strand is treated with a 30% by weight solution of aluminum-tri-n-propyl in "Decalin" (decahydronaphthalene) in another vessel or bath (not shown) to provide a layer of aluminum up to about 0.01 mm. on the fiber strand. The strand of fibers provided with hydroxyl, carbonyl and carboxyl groups is continuously drawn through the solution so that each cross-section dwells therein for 30 minutes to obtain the aluminum layer of the described thickness.

In order to more thoroughly illustrate the present invention, a number of additional examples have been provided in the following table. In this table, % means percent by weight, V means electric potential in volts, A means electric amperage in amperes, B means treatment time, C means carbon, Al means aluminum, Mg means magnesium, Ti means titanium, "Chemical Compound" means the chemical compound containing the embedding element, and mm. means millimeter. In each of Examples 1 to 7, the fiber thickness is 1/100 mm. and the layer thickness of the embedding element on the fiber is likewise 1/100 mm. Also, "Aramit" (not a trademark) is a highly stretched high polymer.

TABLE

| Example No. | Fiber Material Embedding Element | Electrically Conductive Liquid | | | V A | B in Minutes | Chem. Groups | Chem. Compounds in % | Residual Solvent | Special Conditions | B in Minutes |
| | | Substance in %; Remainder Water | Non-Aqueous in % + | Residual Substance | | | | | | | |
| --- | --- | --- | --- | --- | --- | --- | --- | --- | --- | --- | --- |
| 1 | C/Al | Sulfuric acid 50 | — | — | 10 5 | 1 | Hydroxyl carbonyl+ carboxyl | Al-tri-n-propyl 30% | "Decalin" | Heating of solvent | 30 |
| 2 | C/Mg | — | Ammonia 80 | Hydrazoic acid | 10 1 | 4 | Amino, imino+ azid | Ethyl-Mg-Bromide 50 | Diphenyl ether | " | 35 |
| 3 | C/Al | — | Ammonia 80 | Sodium azide | 10 2 | 5 | As in 2 | Al-tri-n-propyl 20 | Carbon tetrachloride | Spontaneous decomposition | 30 |
| 4 | C/Ti | Ammonium peroxydisulfate | — | — | 10 5 | 5 | As in 1 | Ti-IV-sulfate 25 | Water | Heating of fiber | 60 |
| 5 | Boron/Ti | ← No activation → | | | | | | Ti-tetramethyl 20 | Diethyl ether | Room temperature | 20 |
| 6 | "Aramit"/Al | ← No activation → | | | | | | ← As in 1 → | | | |

TABLE-continued

| Example No. | Fiber Material Embedding Element | Electrically Conductive Liquid | | | V A | B in Minutes | Chem. Groups | Chem. Compounds in % | Residual Solvent | Special Conditions | B in Minutes |
| --- | --- | --- | --- | --- | --- | --- | --- | --- | --- | --- | --- |
| | | Substance in %; Remainder Water | Non-Aqueous in % + | Residual Substance | | | | | | | |
| 7 | C/Polyimide | ← As in 2 → | | | | | | ← No decomposition → | | | |

While the novel principles of the invention have been described, it will be understood that various omissions, modifications and changes in these principles may be made by one skilled in the art without departing from the spirit and scope of the invention.

What is claimed is:

1. A process for producing reinforcing carbon fiber for the manufacture of carbon fiber reinforced materials, said carbon reinforcing fiber being composed of carbon fiber substrate having a light metal or metalloid coating thereon exhibiting improved adhesion for the carbon fiber substrate, said process comprising:

forming on the surfaces of said carbon fiber substrate chemical groups capable of forming bonds with respect to the light metal or metalloid of said coating, said chemical groups being formed on the surfaces of said fiber substrate by passing said fiber substrate through an electrically conductive liquid and applying a voltage to said fiber substrate, said voltage being applied to said fiber substrate by spaced voltage applying means in said liquid, each of said voltage applying means being spaced from said fiber substrate so that activated current is applied to said fiber substrate by way of said conductive liquid and without mechanical contact of said fiber substrate with said applying means, and thereafter depositing said light metal or metalloid on the surfaces of the fiber substrate by (a) contacting said fiber substrate with a composition comprising a compound capable of decomposing to yield said light metal or metalloid in atomic form and a solvent for said compound and (b) causing said compound to decompose to thereby yield said light metal or metalloid in atomic form whereby said light metal or metalloid deposits on the surfaces of said fiber substrate and combines with the chemical groups.

2. The process of claim 1, wherein said light metal or metalloid is selected from the group consisting of aluminum, titanium, magnesium and silicon.

3. The process of claim 2, wherein said compound is an organo-metallic compound.

4. The process of claim 3, wherein said organometallic compound is an aluminum-trialkyl compound in which the alkyl groups contain from 1 to 8 carbon atoms.

5. The process of claim 4, wherein said electrically conductive liquid is selected from the group consisting of an aqueous solution of an oxidizing compound and a non-aqueous ionizing compound.

6. The process of claim 1, wherein said compound is capable of non-electrolytically decomposing to yield said metal or metalloid.

7. The process of claim 6, wherein said compound is decomposed (1) catalytically, (2) by reduction, (3) by spontaneous decomposition, or (4) by the application of heat.

8. The process of claim 7, wherein said compound is decomposed by the application of heat.

9. The process of claim 1, wherein said solvent is an organic solvent.

10. The process of claim 1, wherein said electrically conductive liquid is an aqueous solution of potassium permanganate, ammonium peroxidisulfate, sodium hypochlorite, sulfuric acid, or sodium azide or a non-aqueous liquid selected from the group consisting of ammonia, sulfur dioxide, hydrogen cyanide, hydrogen fluoride, and nitrosylchloride, and dinitrogen tetroxide containing hydrocyanic acid or sodium azide dissolved therein.

* * * * *